Patented Apr. 7, 1942

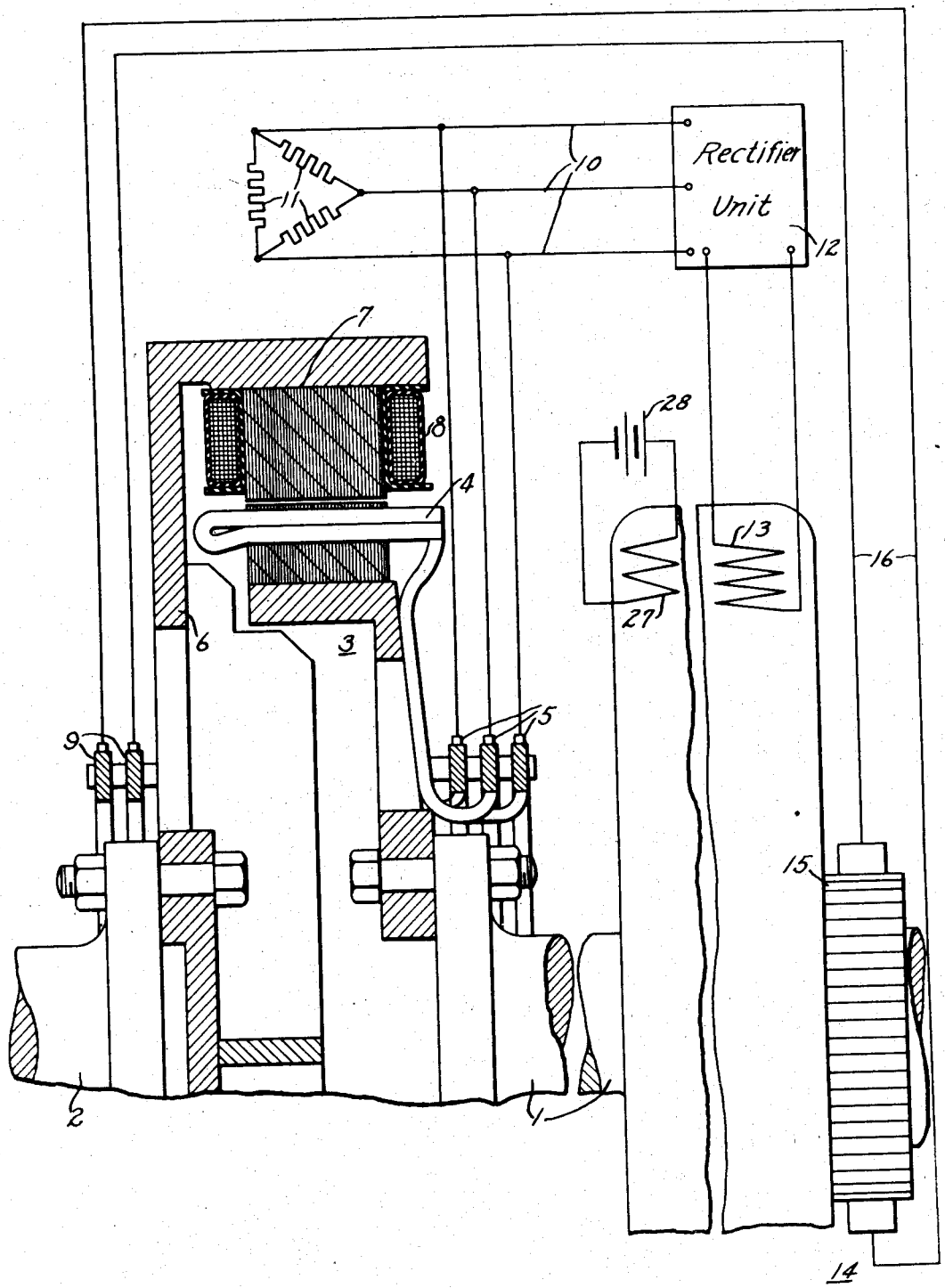

2,278,507

UNITED STATES PATENT OFFICE 2,278,507

ELECTROMAGNETIC COUPLING

René A. Baudry, Pittsburgh, Pa., assignor to Westinghouse Electric & Manufacturing Company, East Pittsburgh, Pa., a corporation of Pennsylvania Application December 21, 1939, Serial No. 310,474

5 Claims. (Cl. 172—284)

My invention relates to an electromagnetic coupling which is particularly useful in ship propulsion drives which are powered by Diesel engines or the like.

An object of my invention is to provide an electromagnetic coupling which has a minimum amount of losses when driven at speeds below the normal rated speed and which is relatively small for a given maximum pullout torque.

Other objects and advantages will become more apparent from a study of the following specification when considered in conjunction with the accompanying drawing, in which:

The single figure is a schematic showing of a portion of a Diesel engine drive which incorporates an electromagnetic coupling in accordance with my invention, the coupling being shown partially in cross-section and the control circuits being shown schematically.

Referring more particularly to the embodiment shown in the single figure, numeral 1 denotes a driving shaft which may be driven by a Diesel engine or any other suitable prime mover, and numeral 2 denotes a driven shaft which in the case of a ship propulsion system is geared to a propeller which drives the ship. Rigidly secured to driving shaft 1 is a rotor structure denoted by numeral 3 having mounted thereon a wound rotor winding 4 which has suitable terminals leading to a plurality of slip rings 5. The driven shaft 2 has a frame structure 6 rigidly secured thereto and upon which frame structure is mounted a plurality of poles such as 7, each of which poles is energized by a field winding 8 which is energized from a direct current source, which will hereinafter be described, fed into slip rings 9. Connected across the slip rings 5 by conductor 10 are a plurality of resistors 11. Connected across the conductors 10 is a rectifier indicated by numeral 12 which is preferably of the dry contact type such as the copper-oxide type. The output terminals of the rectifier 12 are connected to a control field winding 13 which is useful in variably controlling the energization of a direct current generator 14 having an armature 15 rigidly secured to the driving shaft 1. The output current of the armature 15 is fed by conductors 16 to the slip rings 9 to excite the field windings 8.

The operation of the device is as follows: Assuming the separate field winding 27 is energized from the source 28 and the shaft 1 is being driven by the Diesel engine, or other prime mover, then the field windings 8 will be energized. Since there will be a load on shaft 2, the shaft 2 and thus the frame structure 6 and the connected field windings will lag behind, that is frame structure 6 will slip with reference to the wound rotor windings 4. The amount of slip will depend on the torque developed by the shaft, that is, will depend on the variations of the propeller load. Alternating currents will thus be induced in the wound rotor winding 4 which currents are substantially proportional to the slip so long as the pullout torque is not attained. These alternating currents are conducted by means of slip rings 5 to the terminals of the resistors 11. The potentials existing across the terminals of the resistors 11 are applied to the rectifier 12 which rectifies the currents. The rectified current is then fed into the control field winding 13. The main field winding 27 is energized by a suitable source of direct current potential 28. The direct current generator 14 will generate a given direct current by virtue of its coupling to drive shaft 1. However, the voltage of the direct current generator 14 will be modified in accordance with the voltage applied to the control winding 13. Hence, the output of the direct current generator will be substantially proportional to the current variations in the control field winding 13.

It will be seen, therefore, that the field windings 8 will be energized by direct current of a magnitude which is substantially proportional to the amount of slip existing between the driving and driven members.

In previous electromagnetic couplings the field windings as 8 were generally energized at a constant value from a constant potential source of direct current potential irrespective of the different speeds at which the coupling was driven and without regard to the torque demands on the coupling. Exceedingly high losses were thus inherent in such structure, particularly when the electromagnetic clutch was driven at lower than normal speed of the Diesel engine. In accordance with my invention, however, as the propeller is driven at lower speeds, the direct current energization of field windings 8 will be automatically and proportionately lowered, thus conserving a considerable amount of energy and minimizing losses. Furthermore, if the slip was caused to increase suddenly the pullout torque of the coupling would be automatically increased.

To illustrate the approximate savings afforded by an electromagnetic clutch in accordance with my invention, let us assume that for normal speed that 1,000 horsepower is developed by the Diesel engine and that the losses in the electromagnetic clutch amount to 30 horsepower, 15 of which is absorbed in the wound rotor winding and the other 15 of which is absorbed in the direct current energized field windings 8. Now let us assume that instead of normal speed, the device is operated at half normal speed. In this instance, only about 1/8 of the horsepower, that is, 125 horsepower will be developed. The losses in the field windings 8 in conventional magnetic clutches would still be 15 horsepower, whereas the losses in the wound rotor winding 4 would be about 1/8 that value or about 2 horsepower, thus giving a total loss of approximately 17 horsepower.

In accordance with my invention, however, in this latter instance there would be not only 2 horsepower loss in the wound rotor but there would be substantially the same loss in the field windings 8, thus making a total of about 4 horsepower. In other words, instead of having a total loss of 17 horsepower in the electromagnetic clutch, the total loss is only about 4 horsepower, that is a difference of 13 horsepower. It is to be understood, however, that the above figures are merely given for purposes of illustration to give an approximate idea of the relative reduction in losses of an electromagnetic coupling when operating at low speeds and is not intended to indicate the limit of the possibilities of my invention. There are other outstanding features and advantages resulting from my invention, for example, reduction in heating which accompanies reduction in current in the field windings 8 which adds even more to the efficiency of my electromagnetic clutch.

It will be apparent that the driving and driven members may be interchanged without altering the clutch structure or that the wound rotor winding may be located radially outwardly with respect to the field winding 8 instead of radially inwardly thereof as is shown in the drawing. It will also be apparent that instead of the Diesel engine, any suitable prime mover may be used and that instead of a propeller any other suitable load may be driven by the shaft.

The reason the preferred embodiment has been described as incorporating, besides the dry contact type rectifier 12, a direct current generator, is that in ships, liquid rectifiers are unsuitable because of movement present while the ship is in motion. It will be obvious that instead of energizing a direct current generator, the output of the rectifier could be directly connected to the slip rings 9. The outstanding reason for including a generator 14 is to increase the amount of current to a suitable value for energizing field windings 8, it being noted that the efficiency of dry type rectifiers is rather poor, roughly in the order of 50 per cent. If the efficiency were closer to 100 per cent, then generator 14 could be effectively eliminated.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. An electromagnetic coupling comprising, in combination, a driving member, a driven member, one of said members having magnetic poles, a source of direct current for energizing said poles the other member having a wound rotor winding into which is induced alternating current by the field of said poles as the result of and in proportion to the slip between the driving and driven members, slip rings acting as terminals for said wound rotor winding and means external of said slip rings for rectifying said alternating current and means for using the rectified current to control the direct current source for said direct current energized magnetic poles thereby producing direct current excitation which is proportional to slip.

2. An electromagnetic coupling comprising, in combination, a driving member, a driven member, one of said members having direct current energized magnetic poles, the other member having a wound rotor winding in which is induced alternating current by the field of said poles as the result of and in proportion to the slip between the driving and driven members, a plurality of slip rings serving as terminals for said wound rotor winding, resistance means connected across said slip rings, rectifying means connected across said resistance means for rectifying said alternating current, a direct current generator mechanically coupled to the member having the wound rotor winding and having a control winding energized by said rectified current and conductor means for feeding said direct current energized magnetic poles with current from said generator thereby producing a direct current excitation therein which is proportional to said slip.

3. An electromagnetic coupling comprising, in combination, a driving member, a driven member, one of said members having direct current energized magnetic poles, the other member having a wound rotor winding telescoped with respect to said poles and in which is induced alternating current by the field of said poles as the result of and in proportion to the slip between the driving and driven members, a plurality of slip rings serving as terminals for said wound rotor winding, resistance means connected across said slip rings, rectifying means connected across said resistance means for rectifying said alternating current, a direct current generator having a control field winding which is energized by said rectified current and having an armature which is coupled to said driving member and connected to said direct current energized magnetic poles thereby producing direct current excitation therein which is proportional to said slip.

4. An electromagnetic coupling comprising, in combination, a driving member, a driven member electromagnetically coupled thereto, said driven member having direct current energized magnetic poles, the driving member having a wound rotor winding into which is induced alternating current by the field of said poles as the result of and in proportion to the slip between the driving and driven members, a plurality of slip rings serving as terminals for said wound rotor winding, resistance means connected across said slip rings, rectifying means connected across said resistance means for rectifying said alternating current, and means controlled by said rectified current for feeding said direct current energized magnetic poles and producing a direct current excitation therein which is proportional to said slip.

5. An electromagnetic coupling comprising, in combination, a driven member, a driving member, said driving member being disposed radially inwardly and telescoped with respect to said driven member, said driven member having direct current energized magnetic poles, the driving member having a wound rotor winding in which is induced alternating current by the field of said poles as the result of and in proportion to the slip between the driving and driven members, a plurality of slip rings serving as terminals for said wound rotor winding, resistance means connected across said slip rings, rectifying means connected across said resistance means for rectifying said alternating current, and means including a generator having a winding connected to the output of said rectifier means for energizing said direct current energized magnetic poles with current which is proportional to said slip.

RENÉ A. BAUDRY.